(12) United States Patent
Suganuma et al.

(10) Patent No.: US 10,328,390 B2
(45) Date of Patent: Jun. 25, 2019

(54) HOLLOW-FIBER DEGASSING MODULE AND INKJET PRINTER

(71) Applicant: DIC Corporation, Tokyo (JP)

(72) Inventors: Youhei Suganuma, Chiba (JP); Kazumi Oi, Chiba (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/539,066

(22) PCT Filed: Dec. 22, 2015

(86) PCT No.: PCT/JP2015/085846
§ 371 (c)(1),
(2) Date: Jun. 22, 2017

(87) PCT Pub. No.: WO2016/104509
PCT Pub. Date: Jun. 30, 2016

(65) Prior Publication Data
US 2017/0348640 A1 Dec. 7, 2017

(30) Foreign Application Priority Data
Dec. 24, 2014 (JP) ................................ 2014-260804

(51) Int. Cl.
*B01D 53/22* (2006.01)
*B01D 63/04* (2006.01)
(Continued)

(52) U.S. Cl.
CPC ............. *B01D 63/04* (2013.01); *B01D 19/00* (2013.01); *B01D 19/0031* (2013.01);
(Continued)

(58) Field of Classification Search
CPC ........ B01D 63/00; B01D 63/04; B01D 71/26; B01D 71/06; B01D 63/02; B41J 2/19
See application file for complete search history.

(56) References Cited

U.S. PATENT DOCUMENTS 4,770,852 A * 9/1988 Takahara ............. B01D 67/003
128/205.28
4,960,520 A 10/1990 Semmens
(Continued)

FOREIGN PATENT DOCUMENTS

CN 102046271 A 5/2011
EP 1270063 A2 1/2003
(Continued)

OTHER PUBLICATIONS

Office Action issued in corresponding Japanese Patent Application No. 2016-566389, dated Mar. 13, 2018.
(Continued)

*Primary Examiner* — Anthony R Shumate
(74) *Attorney, Agent, or Firm* — McDermott Will & Emery LLP

(57) ABSTRACT

Provided is a hollow fiber degassing module which includes a hollow fiber membrane bundle obtained by bundling a plurality of hollow fiber membranes in a cylindrical shape and a cylindrical body receiving the hollow fiber membrane bundle and extending in an axial direction and degasses a liquid by supplying the liquid to the outside of the hollow fiber membrane and depressurizing the inside of the hollow fiber membrane, in which a hollow fiber membrane packing ratio which is a ratio of a sum of an apparent cross-sectional area of the hollow fiber membrane with respect to an apparent cross-sectional area of the hollow fiber membrane bundle is in a range of 43% or less.

10 Claims, 10 Drawing Sheets

(51) Int. Cl.
   *B01D 19/00* (2006.01)
   *B01D 61/00* (2006.01)
   *B01D 63/02* (2006.01)
   *B01D 71/26* (2006.01)
   *B41J 2/19* (2006.01)

(52) U.S. Cl.
   CPC .............. *B01D 61/00* (2013.01); *B01D 63/02* (2013.01); *B01D 71/26* (2013.01); *B41J 2/19* (2013.01)

(56) References Cited

U.S. PATENT DOCUMENTS

| | | | |
|---|---|---|---|
| 5,139,529 A * | 8/1992 | Seita | B01D 67/003 29/469.5 |
| 5,902,747 A | 5/1999 | Nemser et al. | |
| 2002/0195385 A1* | 12/2002 | Cho | B01D 19/0031 210/321.83 |
| 2003/0192820 A1* | 10/2003 | Cho | B01D 19/0031 210/321.83 |
| 2005/0230856 A1 | 10/2005 | Parekh et al. | |
| 2009/0167829 A1 | 7/2009 | Iijima | |
| 2011/0146891 A1 | 6/2011 | Suganuma et al. | |
| 2017/0259216 A1* | 9/2017 | Madhavaram | B01D 35/30 |
| 2018/0056665 A1* | 3/2018 | Suganuma | B41J 2/19 |

FOREIGN PATENT DOCUMENTS

| | | |
|---|---|---|
| JP | H01-249106 A | 10/1989 |
| JP | H02-107317 A | 4/1990 |
| JP | H05-57152 A | 3/1993 |
| JP | 2000-084368 A | 3/2000 |
| JP | 3553052 B2 | 8/2004 |
| JP | 2013-202575 A | 10/2013 |
| WO | 2007-063720 A1 | 6/2007 |

OTHER PUBLICATIONS

Extended European Search Report issued in corresponding EP Patent Application No. 15873077.0, dated Apr. 13, 2018.
International Search Report dated Feb. 23, 2016 issued in International Patent Application No. PCT/JP2015/085846 (with English translation).
International Preliminary Report on Patentability issued in corresponding International Patent Application No. PCT/JP2015/085846, dated Jul. 6, 2017.
Korean Office Action issued in corresponding Korean Patent Application No. 10-2017-7014359, dated Jul. 20, 2018. with English Translation.
Chinese Office Action issued in corresponding Chinese Patent Application No. 201580064181.7, dated Aug. 3, 2018.

* cited by examiner

HOLLOW-FIBER DEGASSING MODULE AND INKJET PRINTER

CROSS REFERENCE

This patent application is the U.S. National Phase under 35 U.S.C. § 371 of International Application No. PCT/JP2015/085846, filed on Dec. 22, 2015, which claims the benefit of Japanese Patent Application No. 2014-260804, filed on Dec. 24, 2014, the entire contents of each are hereby incorporated by reference.

TECHNICAL FIELD

The present invention relates to a hollow fiber degassing module which degases a liquid and an inkjet printer which includes the hollow fiber degassing module.

BACKGROUND ART

An inkjet printer is a printing machine using a system in which droplets of ink are directly sprayed onto a printing medium. In such an inkjet printer, there is a possibility that a gas dissolved in the ink is gasified due to a change in pressure inside an ink storage portion during printing so that a nozzle is blocked. As a result, there is a risk that printing quality is noticeably degraded. This risk becomes remarkable in a long-term use and a high-speed operation. In order to solve such a problem, it is effective to perform degassing to remove dissolved gas and bubbles from the ink. As a method of effectively degassing the ink, Patent Literature 1 discloses a method of continuously degassing the ink by attaching a hollow fiber degassing module using a hollow fiber membrane to an ink passage reaching an inkjet head from an ink storage portion.

The hollow fiber degassing module disclosed in Patent Literature 1 is an external perfusion type hollow fiber degassing module and a hollow fiber membrane bundle obtained by bundling a plurality of hollow fiber membranes is received in a cylindrical body. Then, the ink is supplied to the outside of the hollow fiber membrane and the inside of the hollow fiber membrane is depressurized to degas the ink, and the degassed ink is discharged from a discharge port formed in a side wall of the cylindrical body.

CITATION LIST

Patent Literature

Patent Literature 1: PCT International Publication No. WO 2007/063720

SUMMARY OF INVENTION

Technical Problem

In recent years, ceramic ink in which ceramic powder is dispersed in an organic solvent has been used as ink used in an inkjet printer. Incidentally, when the ceramic ink is degassed by the hollow fiber degassing module of the related art, there is a case in which the feeding of the ink fails in a few days. Here, as a result of examination of such a reason, the inventors found that the pressure drop of the hollow fiber degassing module suddenly increased with the degassing of the ink so that the feeding of the ink failed.

Here, an aspect of the invention is to provide a hollow fiber degassing module and an inkjet printer capable of suppressing a sudden increase in pressure drop.

Solution to Problem

In order to attain the above-described object, the inventors examined a reason why the pressure drop of the hollow fiber degassing module increased. As a result, it was found that the hollow fiber membrane was swollen by the ink so that a gap between the hollow fiber membranes was narrowed and the pressure drop of the hollow fiber degassing module increased suddenly. Then, as a result of further examination based on such finding, it was found that the hollow fiber membrane packing ratio in the hollow fiber membrane bundle greatly influenced a sudden increase in pressure drop of the hollow fiber degassing module. Therefore, the invention has been contrived.

That is, a hollow fiber degassing module according to an aspect of the invention includes a hollow fiber membrane bundle obtained by bundling a plurality of hollow fiber membranes in a cylindrical shape and a cylindrical body receiving the hollow fiber membrane bundle and extending in an axial direction and degasses a liquid by supplying the liquid to the outside of the hollow fiber membrane and depressurizing the inside of the hollow fiber membrane, in which a hollow fiber membrane packing ratio which is a ratio of a sum of an apparent cross-sectional area of the hollow fiber membrane with respect to an apparent cross-sectional area of the hollow fiber membrane bundle is in a range of 43% or less.

The hollow fiber degassing module according to an aspect of the invention is of an external perfusion type in which a liquid is supplied to the outside of the hollow fiber membrane and the inside of the hollow fiber membrane is depressurized to degas the liquid. For this reason, in the hollow fiber degassing module, the pressure drop of the liquid can be suppressed to be low. Then, in the hollow fiber degassing module, since the hollow fiber membrane packing ratio is 43% or less, it is possible to ensure a gap through which the liquid passes between the hollow fiber membranes even when the hollow fiber membrane is swollen by the liquid to be degassed. Here, the apparent cross-sectional area of the hollow fiber membrane bundle is an area in which a cross-section area defined by the inner peripheral surface of the hollow fiber membrane bundle is removed from a cross-section area defined by the outer peripheral surface of the hollow fiber membrane bundle. The apparent cross-sectional area of the hollow fiber membrane is an area of a cross-section area defined by the outer peripheral surface of one hollow fiber membrane. Accordingly, it is possible to suppress a sudden increase in pressure drop of the hollow fiber degassing module.

In the hollow fiber degassing module, the hollow fiber membrane packing ratio may be 20% or more.

In the hollow fiber degassing module, the hollow fiber membrane may contain a material which is swollen by the liquid.

In the hollow fiber degassing module, the hollow fiber membrane may contain polyolefin resin.

An inkjet printer according to an aspect of the invention is an inkjet printer in which ink stored in an ink storage portion is supplied to an inkjet head through an ink passage, and the above-described hollow fiber degassing module is attached to the ink passage.

In the inkjet printer according to an aspect of the invention, since the hollow fiber degassing module is attached to the ink passage, it is possible to suppress the pressure drop of the ink in the ink passage to be low and to degas the ink for a long period of time.

Advantageous Effects of Invention

According to an aspect of the invention, a sudden increase in pressure drop can be suppressed.

DESCRIPTION OF EMBODIMENTS

Figure 1:
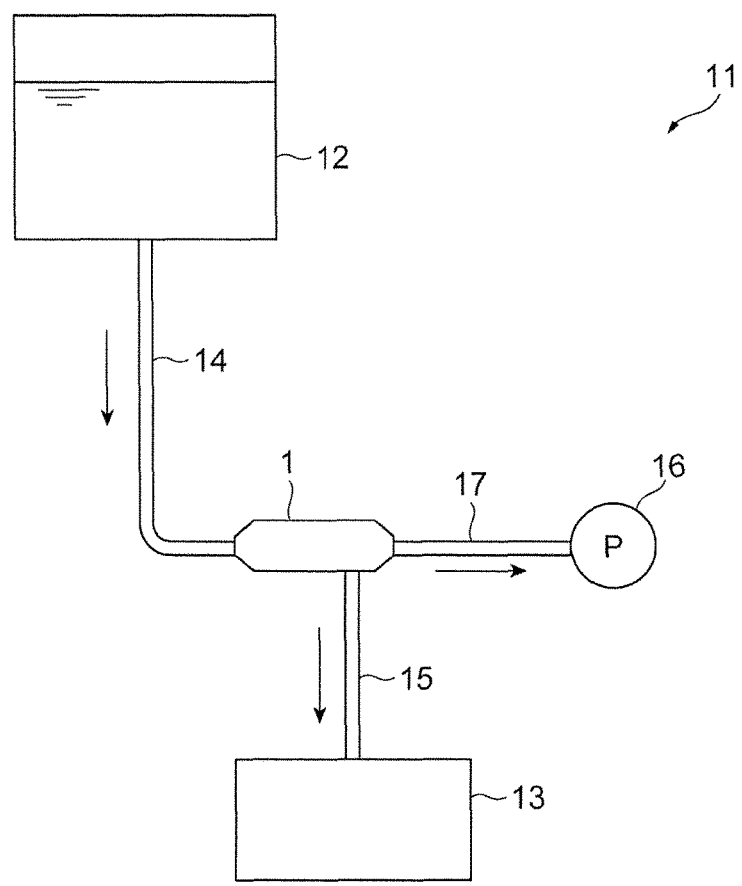
FIG. 1 is a schematic configuration diagram of an inkjet printer according to an embodiment.

Hereinafter, a hollow fiber degassing module and an inkjet printer of an embodiment will be described in detail with reference to the drawings. The hollow fiber degassing module of the embodiment is obtained by applying a hollow fiber degassing module of an aspect of the invention to a hollow fiber degassing module for degassing ink. Additionally, in all drawings, the same or corresponding parts are denoted by the same reference numerals, and redundant description is omitted.

FIG. 1 is a schematic configuration diagram of an inkjet printer according to an embodiment. As shown in FIG. 1, an inkjet printer 11 according to the embodiment mainly includes an ink storage portion 12 which is an ink tank for storing ink, an inkjet head 13 which directly sprays dropletized ink to a printing medium, a first ink supply pipe 14 to which ink is supplied from the ink storage portion 12, a second ink supply pipe 15 which supplies ink to the inkjet head 13, a hollow fiber degassing module 1 according to the embodiment which is attached to the first ink supply pipe 14 and the second ink supply pipe 15 and degases ink, a suction pump 16 which is used for a vacuum suctioning operation, and an intake pipe 17 which connects the suction pump 16 and the hollow fiber degassing module 1 to each other. Additionally, the first ink supply pipe 14 and the second ink supply pipe 15 are ink passages which reach the inkjet head 13 from the ink storage portion 12. The ink used in the inkjet printer 11 is not particularly limited and includes, for example, aqueous ink, UV ink, solvent ink, and ceramic ink.

Figure 2:
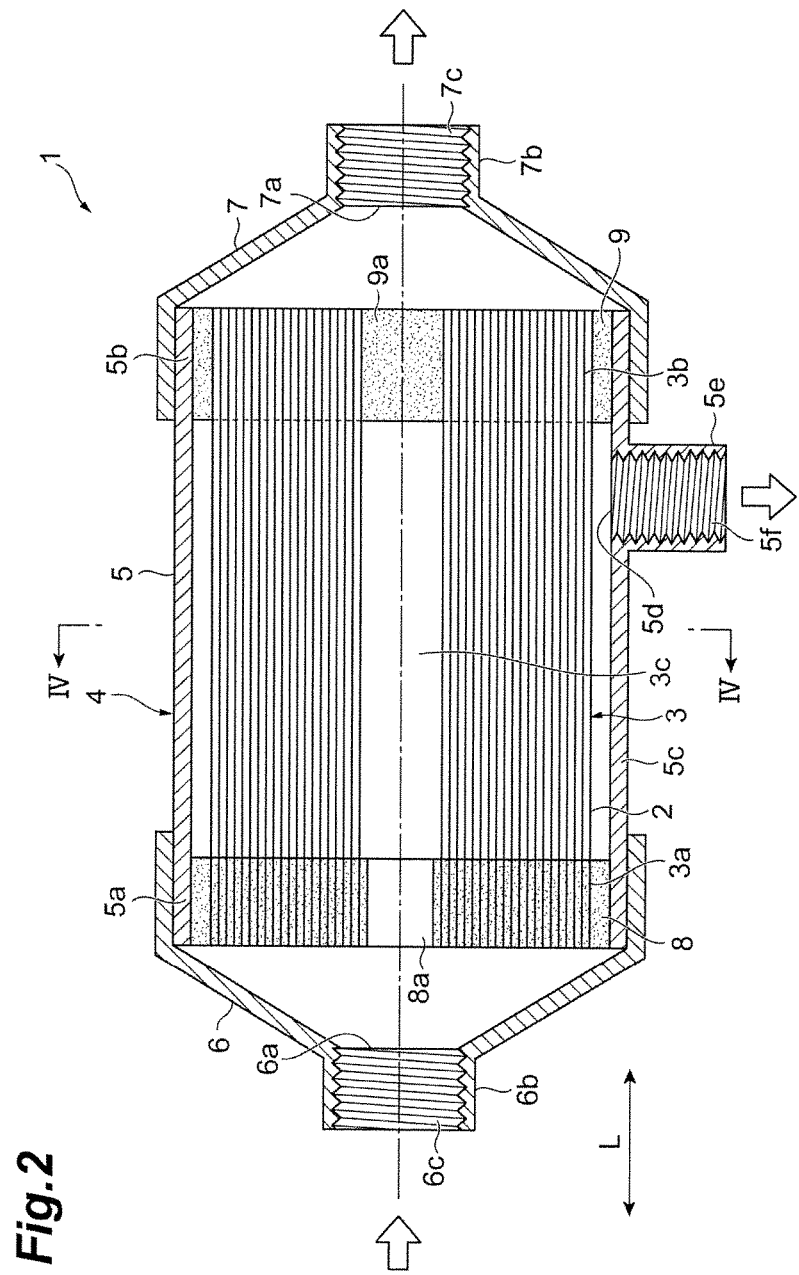
FIG. 2 is a schematic cross-sectional view of a hollow fiber degassing module according to the embodiment.
Figure 3:
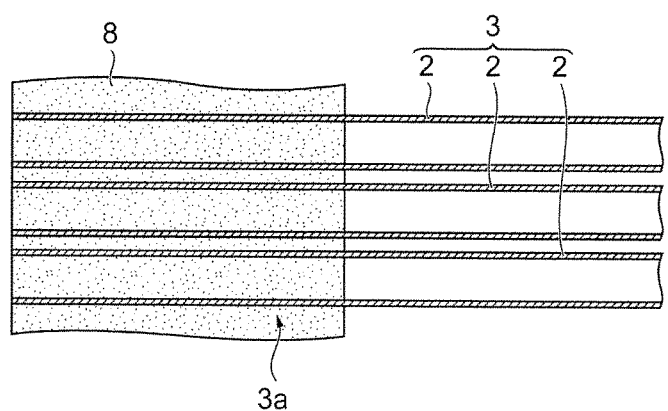
FIG. 3 is a partially enlarged view of a hollow fiber membrane bundle shown in FIG. 2.
Figure 3:
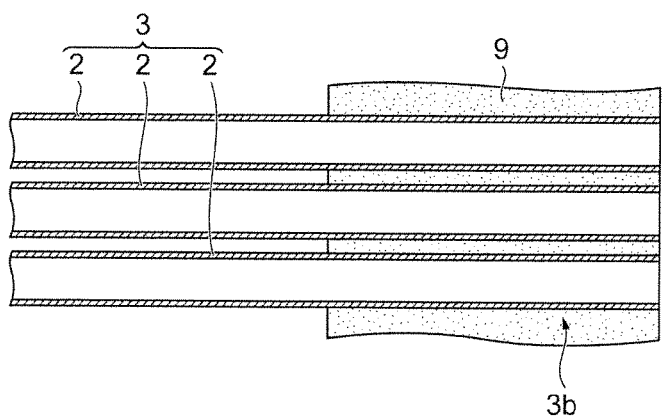
Figure 4:
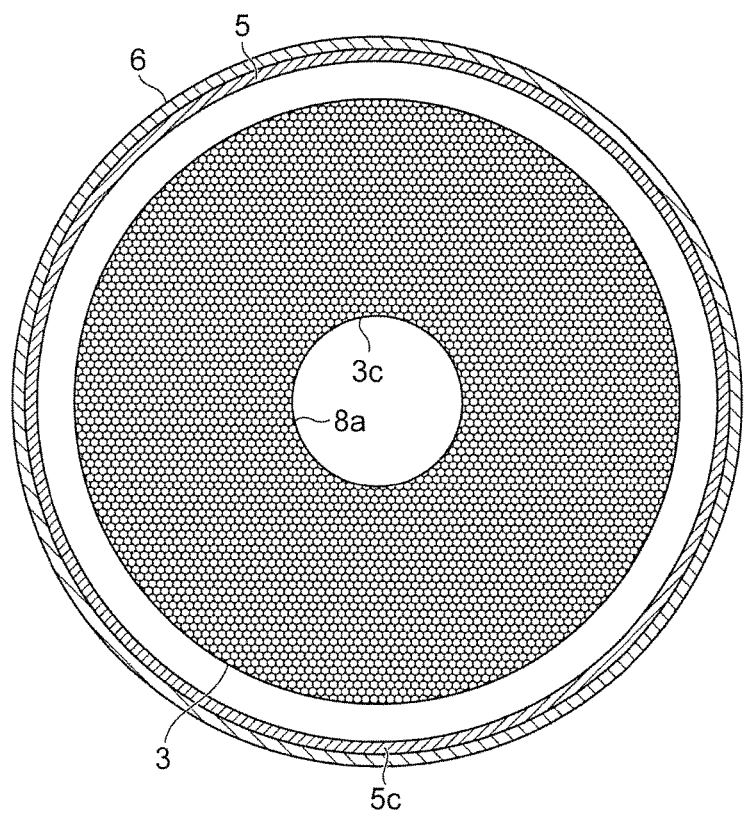
FIG. 4 is a cross-sectional view taken along a line IV-IV shown in FIG. 2.

FIG. 2 is a schematic cross-sectional view of the hollow fiber degassing module according to the embodiment. FIG. 3 is a partially enlarged view of the hollow fiber membrane bundle shown in FIG. 2. FIG. 4 is a cross-sectional view taken along a line IV-IV shown in FIG. 2. As shown in FIGS. 1 to 4, the hollow fiber degassing module 1 includes a hollow fiber membrane bundle 3 in which a plurality of hollow fiber membranes 2 are bundled in a cylindrical shape and a housing 4 which receives the hollow fiber membrane bundle 3. The hollow fiber degassing module 1 degases ink by supplying the ink to the outside of the hollow fiber membrane 2 and depressurizing the inside of the hollow fiber membrane 2. Additionally, in FIG. 4, the hollow fiber membranes 2 are schematically depicted and are different from the actual shapes.

The hollow fiber membrane 2 is a hollow fiber-shaped membrane which allows the permeation of a gas but does not allow the permeation of a liquid. The hollow fiber membrane 2 has a property that the hollow fiber membrane is swollen by the ink. The material, the membrane shape, and the membrane form, and the like of the hollow fiber membrane 2 are not particularly limited. Examples of the material of the hollow fiber membrane 2 include polyolefin-based resins such as polypropylene and poly(4-methylpentene-1), silicon-based resins such as polydimethylsiloxane and a copolymer thereof, and fluorine-based resins such as PTFE and vinylidene fluoride. Examples of the membrane shape (shape of the side wall) of the hollow fiber membrane 2 include a porous membrane, a microporous membrane, and a homogeneous membrane not having porosity (non-porous membrane). As the membrane form of the hollow fiber membrane 2, for example, a symmetrical membrane (homogeneous membrane) having homogeneous chemical or physical structure of the whole membrane, an asymmetric membrane (heterogeneous membrane) in which the chemical or physical structure of the membrane differs depending on the membrane portion. The asymmetric membrane (heterogeneous membrane) is a membrane having a non-porous dense layer and porosity. In this case, the dense layer may be formed at anywhere in the membrane so as to be located on a surface layer portion of the membrane or the inside of the porous membrane. The heterogeneous membrane includes a composite membrane having a different chemical structure and a multilayered structure membrane such as a three-layered structure. In particular, since a heterogeneous membrane using poly(4-methylpentene-1) resin includes a dense layer for blocking a liquid, it is particularly desirable for degassing a liquid other than water, for example, ink. In the case of a hollow fiber used for an external perfusion type, it is desirable that the dense layer is formed on the outer surface of the hollow fiber.

The hollow fiber membrane bundle 3 can be formed, for example, by a hollow fiber membrane sheet (not shown) in which a plurality of hollow fiber membranes 2 are woven in the form of a reed. In this case, for example, the hollow fiber membrane sheet is wound around a cylindrical temporary core to be bundled into a cylindrical shape, both end portions of the hollow fiber membrane sheet bundled in a cylindrical shape are fixed, and the temporary core is extracted from the hollow fiber membrane sheet of which both end portions are fixed. Accordingly, the hollow fiber degassing module 1 without a center pipe can be prepared in a membrane bundle hollow portion 3c located at the center of the hollow fiber membrane bundle 3 in the radial direction. In this case, the hollow fiber membrane bundle 3 is formed by, for example, the hollow fiber membrane sheet having thirty to ninety hollow fiber membranes 2 per inch. Accordingly, even when the center pipe is not provided in the membrane bundle hollow portion 3c located at the center of the hollow fiber membrane bundle 3 in the radial direction, the ink can flow without any deviation.

The housing 4 includes a cylindrical body 5, a first lid portion 6, and a second lid portion 7.

The cylindrical body 5 is a part which receives the hollow fiber membrane bundle 3. The cylindrical body 5 is formed in a cylindrical shape extending in an axial direction L and both end portions of the cylindrical body 5 are opened. The first lid portion 6 is attached to one opening end portion 5a which is one opening end portion of the cylindrical body 5 and the second lid portion 7 is attached to the other opening end portion 5b which is the other opening end portion of the cylindrical body 5. The first lid portion 6 and the second lid portion 7 can be attached to the cylindrical body 5 by, for example, threading, fitting, adhering, or the like.

The first lid portion 6 is formed in a tapered shape to decrease in diameter as it goes away from the cylindrical body 5. A front end portion of the first lid portion 6 is provided with a supply port 6a which supplies ink into the first lid portion 6. The supply port 6a is a cylindrical opening and is formed on a center axis of the cylindrical body 5. A connection portion 6b which is separably connected to the first ink supply pipe 14 extends from the supply port 6a along the axial direction L. The connection portion 6b is formed in a cylindrical shape and the inner peripheral surface of the connection portion 6b is provided with a female screw 6c into which the first ink supply pipe 14 is threaded. Additionally, the connection between the connection portion 6b and the first ink supply pipe 14 is not limited to threading and may be, for example, fitting.

The second lid portion 7 is formed in a tapered shape to decrease in diameter as it goes away from the cylindrical body 5. A front end portion of the second lid portion 7 is provided with an intake port 7a which suctions a gas from the inside of the housing 4. The intake port 7a is a cylindrical opening and is formed on the center axis of the cylindrical body 5. A connection portion 7b which is separably connected to the intake pipe 17 extends from the intake port 7a along the axial direction L. The connection portion 7b is formed in a cylindrical shape and the inner peripheral surface of the connection portion 7b is provided with a female screw 7c into which the intake pipe 17 is threaded. Additionally, the connection between the connection portion 7b and the intake pipe 17 is not limited to threading and may be, for example, fitting.

A side wall 5c of the cylindrical body 5 is provided with a discharge port 5d which discharges the ink from the inside of the housing 4. The discharge port 5d is a cylindrical opening. The discharge port 5d is formed near the other opening end portion 5b in relation to the center in the axial direction L of the cylindrical body 5. A connection portion 5e which is separably connected to the second ink supply pipe 15 extends from the discharge port 5d in a direction orthogonal to the axial direction L. The connection portion 5e is formed in a cylindrical shape and the inner peripheral surface of the connection portion 5e is provided with a female screw 5f into which the second ink supply pipe 15 is threaded. Additionally, the connection between the connection portion between the discharge port 5d and the second ink supply pipe 15 is not limited to threading and may be, for example, fitting.

The cylindrical body 5, the first lid portion 6, and the second lid portion 7 are desirably formed of resin from the viewpoint of ease of manufacturing. In this case, the cylindrical body 5, the first lid portion 6, and the second lid portion 7 can be manufactured by injection molding. In consideration of a case where UV ink is used as the ink, the cylindrical body 5, the first lid portion 6, and the second lid portion 7 desirably have a color that does not transmit ultraviolet light, for example, black.

Then, one membrane bundle end portion 3a of the hollow fiber membrane bundle 3 is fixed to one opening end portion 5a of the cylindrical body 5 by a sealing portion 8 and the other membrane bundle end portion 3b of the hollow fiber membrane bundle 3 is fixed to the other opening end portion 5b of the cylindrical body 5 by a sealing portion 9.

The sealing portion 8 is formed of resin. As the resin used in the sealing portion 8, for example, epoxy resin, urethane resin, ultraviolet curable resin, and polyolefin resin such as polyethylene and polypropylene can be exemplified. The sealing portion 8 is charged to an entire area other than the membrane bundle hollow portion 3c in a cross-section perpendicular to the axial direction L of the cylindrical body 5. That is, the sealing portion 8 is only charged between the hollow fiber membranes 2, into the hollow fiber membrane 2, and between the hollow fiber membrane bundle 3 and the inner wall of the cylindrical body 5 (see FIG. 3(a)). Then, the sealing portion 8 is provided with a communication port 8a which communicates the membrane bundle hollow portion 3c with the outside of the cylindrical body 5. For this reason, the ink which is supplied from the supply port 6a into the first lid portion 6 is supplied into the cylindrical body 5 only from the communication port 8a and is supplied to the outside of the hollow fiber membrane 2 inside the cylindrical body 5.

The sealing portion 9 is formed of the same resin as that of the sealing portion 8. The sealing portion 9 is charged to an entire area other than the inside of the hollow fiber membrane 2 in a cross-section perpendicular to the axial direction L of the cylindrical body 5. That is, the sealing portion 9 is not charged into the hollow fiber membrane 2 and is charged only between the hollow fiber membranes 2, between the hollow fiber membrane bundle 3 and the inner wall of the cylindrical body 5, and into the membrane bundle hollow portion 3c (see FIG. 3(b)). For this reason, it is possible to prevent the ink which is supplied to the cylindrical body 5 from flowing to the second lid portion 7 beyond the sealing portion 9. Further, since the inside of the hollow fiber membrane 2 communicates with the inside of the second lid portion 7, the inside of the hollow fiber membrane 2 is depressurized when air is suctioned from the intake port 7a by the suction pump 16.

The sealing portion 8 fixes one membrane bundle end portion 3a of the hollow fiber membrane bundle 3 to the cylindrical body 5, for example, so that the center axis of one membrane bundle end portion 3a of the hollow fiber membrane bundle 3 matches the center axis of the cylindrical body 5. Further, the sealing portion 9 fixes the other membrane bundle end portion 3b of the hollow fiber membrane bundle 3 to the cylindrical body 5, for example, so that the center axis of the other membrane bundle end portion 3b of the hollow fiber membrane bundle 3 matches the center axis of the cylindrical body 5. Additionally, the sealing portion 9 may fix the other membrane bundle end portion 3b of the hollow fiber membrane bundle 3 to the cylindrical body 5, for example, so that the center axis of the other membrane bundle end portion 3b of the hollow fiber membrane bundle 3 is eccentric to the opposite side to the discharge port 5d with respect to the center axis of the cylindrical body 5.

Additionally, a ratio between the inner diameter D of the cylindrical body 5 and the length of the hollow fiber membrane bundle 3 in the axial direction L is desirably 1:1 to 1:6.

Figure 5:
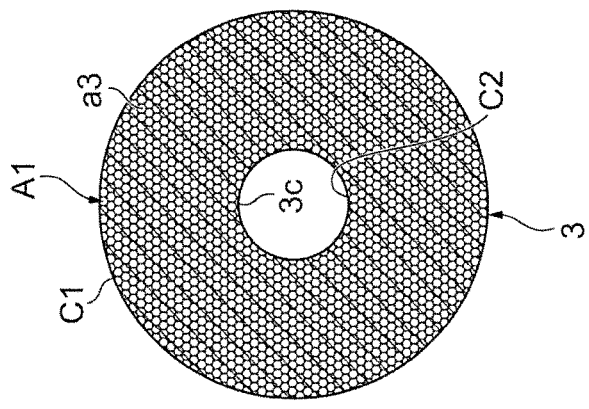
FIG. 5 is a cross-sectional view of the hollow fiber membrane bundle.
Figure 5:
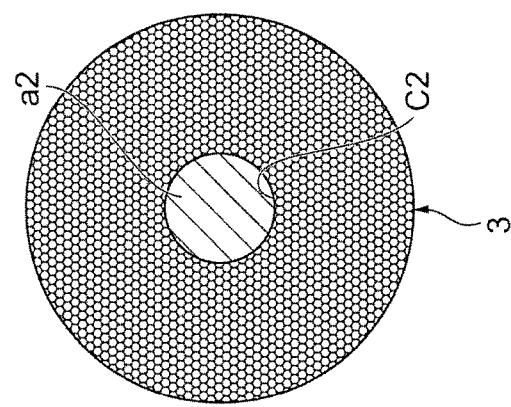
Figure 5:
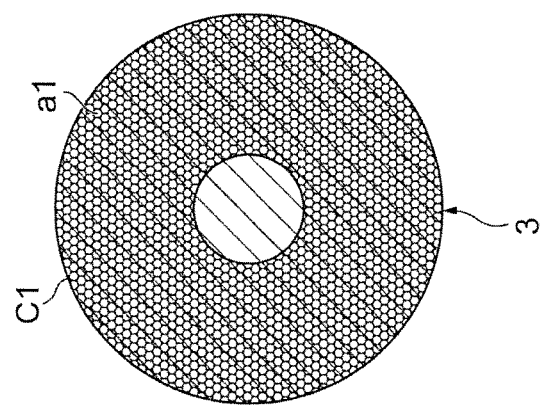
Figure 6:
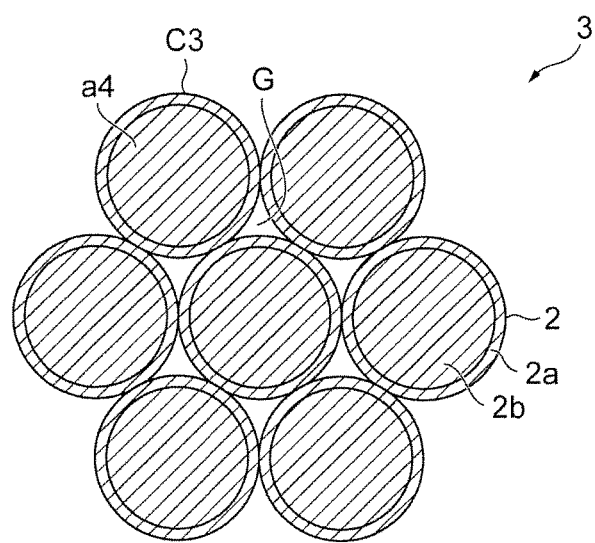
FIG. 6 is a partially enlarged view of the hollow fiber membrane bundle shown in FIG. 5.

Here, a ratio of a sum A3 of an apparent cross-sectional area A2 of the hollow fiber membrane 2 with respect to an apparent cross-sectional area A1 of the hollow fiber membrane bundle 3 is set as a hollow fiber membrane packing ratio R. Hereinafter, the hollow fiber membrane packing ratio R will be described in detail. FIG. 5 is a cross-sectional view of the hollow fiber membrane bundle and shows the same cross-section as that of FIG. 4. FIG. 6 is a partially enlarged view of the hollow fiber membrane bundle shown in FIG. 5. Additionally, in FIG. 5, the hollow fiber membranes 2 are schematically depicted and are different from the actual shapes.

As shown in (a) of FIG. 5, the outer peripheral surface of the hollow fiber membrane bundle 3 is set as an outer peripheral surface C1 and a cross-section area defined by the outer peripheral surface C1 is set as a cross-section area a1. The cross-section area a1 is a hatched area indicated by hatching in (a) of FIG. 5. Additionally, the outer peripheral surface C1 is the outer peripheral surface forming the outer shape of the hollow fiber membrane bundle 3, but since the hollow fiber membrane bundle 3 is an aggregate of the plurality of hollow fiber membranes 2, the outer peripheral surface C1 becomes a virtual circumferential surface which comes into contact with the outside of the plurality of hollow fiber membranes 2 disposed on the outermost layer of the hollow fiber membrane bundle 3 in the radial direction. In this case, one or the plurality of hollow fiber membranes 2 which are released from the cylindrical hollow fiber membrane bundle 3 are excluded from the plurality of hollow fiber membranes 2 disposed on the outermost layer.

As shown in (b) of FIG. 5, the inner peripheral surface of the hollow fiber membrane bundle 3 is set as an inner peripheral surface C2 and a cross-section area defined by the inner peripheral surface C2 is set as a cross-section area a2. The cross-section area a2 is a hatched area indicated by hatching in (b) of FIG. 5. Additionally, the inner peripheral surface C2 is the outer peripheral surface defining the membrane bundle hollow portion 3c, but the hollow fiber membrane bundle 3 is an aggregate of the plurality of hollow fiber membranes 2. For this reason, the inner peripheral surface C2 becomes a virtual circumferential surface which comes into contact with the outside of the plurality of hollow fiber membranes 2 disposed on the innermost layer of the hollow fiber membrane bundle 3 in the radial direction. In this case, one or the plurality of hollow fiber membranes 2 which are released from the cylindrical hollow fiber membrane bundle 3 are excluded from the plurality of hollow fiber membranes 2 disposed on the innermost layer.

As shown in (a), (b), and (c) of FIG. 5, an area obtained by removing the cross-section area a2 from the cross-section area a1 is set as a cross-section area a3. The cross-section area a3 is a hatched area indicated by hatching in (c) of FIG. 5. Then, the area of the cross-section area a3 becomes the apparent cross-sectional area A1 of the hollow fiber membrane bundle 3.

As shown in FIG. 6, the outer peripheral surface of one hollow fiber membrane 2 is set as an outer peripheral surface C3 and a cross-section area defined by the outer peripheral surface C3 is set as a cross-section area a4. The cross-section area a4 is a hatched area indicated by hatching in FIG. 6. That is, the cross-section area a4 is an area obtained by adding the cross-section area of the membrane 2a of the hollow fiber membrane 2 formed in a cylindrical shape and the cross-section area of the hollow portion 2b of the hollow fiber membrane 2. Then, the area of the cross-section area a4 becomes the apparent cross-sectional area A2. Then, when the number of the hollow fiber membranes 2 forming the hollow fiber membrane bundle 3 is indicated by N, a value obtained by multiplying the apparent cross-sectional area A2 by N becomes the sum A3 of the apparent cross-sectional area A2 of the hollow fiber membrane 2. That is, the sum A3 of the apparent cross-sectional area A2 of the hollow fiber membrane 2 is calculated by the equation of A2×N. Further, a gap G between the hollow fiber membranes 2 of the hollow fiber membrane bundle 3 is excluded from the sum A3 of the apparent cross-sectional area A2 of the hollow fiber membrane 2.

For this reason, the hollow fiber membrane packing ratio R is calculated by the equation of (A2×N)/A1. Then, in the hollow fiber degassing module 1, the hollow fiber membrane packing ratio R which is calculated in this way becomes in the range of 43% or less. In this case, the hollow fiber membrane packing ratio R is more desirably in the range of 40% or less and further desirably in the range of 38% or less. When the hollow fiber membrane packing ratio R is set in the range of 43% or less, it is possible to ensure a gap through which the ink passes between the hollow fiber membranes 2 even when the hollow fiber membrane 2 is swollen by the degassed ink. Accordingly, it is possible to suppress a sudden increase in pressure drop of the hollow fiber degassing module 1.

Further, the hollow fiber membrane packing ratio R is desirably in the range of 20% or more, more desirably in the range of 25% or more, and further desirably in the range of 30% or more. When the hollow fiber membrane packing ratio R is set in the range of 20% or more, it is possible to ensure a membrane area necessary for degassing the ink. Accordingly, it is possible to suppress degradation in degassing performance of the hollow fiber degassing module 1.

Next, an ink degassing method using the hollow fiber degassing module 1 will be described.

The ink which is supplied from the ink storage portion 12 to the first ink supply pipe 14 is supplied from the supply port 6a into the first lid portion 6. The ink which is supplied into the first lid portion 6 is supplied to the membrane bundle hollow portion 3c through the communication port 8a. The ink which is supplied to the membrane bundle hollow portion 3c passes through a gap between the hollow fiber membranes 2 forming the hollow fiber membrane bundle 3 and flows to the outside of the cylindrical body 5 in the radial direction. That is, the ink which is supplied to the membrane bundle hollow portion 3c is supplied to the outside of the hollow fiber membrane 2 inside the cylindrical body 5. At this time, when the suction pump 16 is operated so that air inside the housing 4 is suctioned from the intake port 7a, the inside of the hollow fiber membrane 2 is depressurized. Then, when the ink passes between the hollow fiber membranes 2, dissolved gas and air bubbles are drawn into the hollow fiber membranes 2 from the ink. Accordingly, the ink is degassed. Then, the degassed ink flows from the discharge port 5d into the second ink supply pipe 15 to be supplied from the second ink supply pipe 15 to the inkjet head 13.

At this time, the hollow fiber membrane 2 is swollen by the ink with the passage of time. Further, a gap between the hollow fiber membranes 2 is narrowed as the hollow fiber membrane 2 is swollen and the hollow fiber membrane 2 is bent in accordance with the flow of the ink so that a gap through which the ink passes between the hollow fiber membranes 2 is blocked. Then, since the ink passes through the narrow gap between the hollow fiber membranes 2, the pressure drop of the ink in the hollow fiber degassing module 1 increases. On the other hand, the swelling of the hollow fiber membrane 2 is limited, and when the ink flows through the hollow fiber degassing module 1 for about two days, the swelling of the hollow fiber membrane 2 becomes saturated. The swelling speed and the swelling degree of the hollow fiber membrane 2 change depending on the material, the membrane shape, the membrane form, and the like of the hollow fiber membrane 2 and also changes depending on the type of ink. For example, when a polyolefin resin is used as the material of the hollow fiber membrane 2 and a ceramic powder dispersed in a solvent is used as the ink, the swelling speed and swelling degree of the hollow fiber membrane 2 become particularly large.

For example, when polyolefin resin is used as the material of the hollow fiber membrane 2 and ceramic ink in which ceramic powder is dispersed in a solvent is used as the ink, the swelling speed and the swelling degree of the hollow fiber membrane 2 particularly increase.

Herein, the solvent used in the ceramic ink is not particularly limited as long as it does not impair the effect of the invention, and known solvents may be used. Specific examples thereof include glycols such as ethylene glycol, diethylene glycol, and triethylene glycol; glycol monoalkyl ethers such as 3-methoxy-3-methylbutanol and 3-methoxybutanol; glycol dialkyl ethers such as diethylene glycol diethyle ether, diethylene glycol methyl ethyl ether, diethylene glycol methyl butyl ether, triethylene glycol methyl butyl ether, and tetraethylene glycol dimethyl ether; glycol monoacetates such as ethylene glycol monobutyl ether acetate, diethylene glycol monobutyl ether acetate, and propylene glycol monomethyl ether acetate; glycol diacetates; alcohols such as ethanol, n-propanol, isopropanol, n-butanol, 2-butanol, and 2-methyl-1-propanol; ketones such as acetone, methyl ethyl ketone, methyl-n-propyl ketone, methyl isopropyl ketone, methyl-n-butyl ketone, methyl isobutyl ketone, methyl-n-amyl ketone, methyl isoamyl ketone, diethyl ketone, ethyl n-propyl ketone, ethyl isopropyl ketone, ethyl-n-butyl ketone, ethyl isobutyl ketone, di-n-propyl ketone, diisobutyl ketone, cyclohexanone, methylcyclohexanone, and isophorone; acetic acid esters such as methyl acetate, ethyl acetate, n-propyl acetate, isopropyl acetate, n-butyl acetate, isobutyl acetate, hexyl acetate, octyl acetate, 2-methylpropyl acetate, and 3-methylbutyl acetate; lactic acid esters such as methyl lactate, ethyl lactate, and butyl lactate; saturated hydrocarbons such as n-hexane, isohexane, n-nonane, isononane, dodecane, and isododecane; unsaturated hydrocarbons such as 1-hexene, 1-heptene, and 1-octene; cyclic saturated hydrocarbons such as cyclohexane, cycloheptane, cyclooctane, cyclodecane, and decalin; cyclic unsaturated hydrocarbons such as cyclohexene, cycloheptene, cyclooctene, 1,1,3,5,7-cyclooctatetraene, and cyclododecene; aromatic hydrocarbons such as benzene, toluene, and xylene; terpenes; cyclic imides; 3-alkyl-2-oxazolidinone such as 3-methyl-2-oxazolidinone and 3-ethyl-2-oxazolidinone; N-alkyl pyrrolidone such as N-methyl-2-pyrrolidone and N-ethyl-2-pyrrolidone; lactones such as γ-butyrolactone and s-caprolactone; and nitrogen-containing solvents such as β-alkoxypropionamide.

From these things, it is effective to set a gap between the hollow fiber membrane 2 within an appropriate range when the swelling of the hollow fiber membrane 2 becomes saturated in order to suppress a sudden increase in pressure drop of the ink. Then, as a result of careful examination of the inventors, if the hollow fiber membrane packing ratio R is set to 43% or less, a gap between the hollow fiber membranes 2 is set to an appropriate range when the swelling of the hollow fiber membrane 2 becomes saturated. Accordingly, a sudden increase in pressure drop of the ink can be suppressed.

In this way, the hollow fiber degassing module 1 according to the embodiment is of an external perfusion type in which the ink is supplied to the outside of the hollow fiber membrane 2 and the inside of the hollow fiber membrane 2 is depressurized to degas the ink. For this reason, it is possible to suppress the pressure drop of ink to a low level. Accordingly, for example, even when the hollow fiber degassing module 1 is mounted on the inkjet printer 11 which supplies the ink from the ink storage portion 12 to the inkjet head 13 by the own weight of the ink, the ink can be appropriately supplied to the inkjet head 13.

Then, in the hollow fiber degassing module 1, since the hollow fiber membrane packing ratio R of the hollow fiber degassing module 1 is 43% or less, it is possible to ensure a gap through which the ink passes between the hollow fiber membranes 2 even when the hollow fiber membrane 2 is swollen by the degassed ink. Accordingly, it is possible to suppress a sudden increase in pressure drop of the hollow fiber degassing module 1. That is, even when the hollow fiber membrane 2 contains a material which is swollen by the ink, it is possible to suppress degradation in degassing performance of the hollow fiber degassing module 1.

Further, when the hollow fiber membrane packing ratio R is 20% or more, it is possible to ensure a membrane area necessary for degassing the ink. Accordingly, it is possible to suppress degradation in degassing performance of the hollow fiber degassing module 1.

Further, even when the hollow fiber membrane 2 contains a material which is swollen by the ink, it is possible to suppress degradation in degassing performance of the hollow fiber degassing module 1.

Further, since the hollow fiber membrane 2 contains polyolefin resin, it is possible to effectively degas the ink.

Further, in the inkjet printer 11 according to the embodiment, since the hollow fiber degassing module 1 is attached to the ink passage including the first ink supply pipe 14 and the second ink supply pipe 15, it is possible to suppress the pressure drop of the ink in the ink passage to be low and to degas the ink for a long period of time. Accordingly, for example, even in the inkjet printer 11 which supplies the ink from the ink storage portion 12 to the inkjet head 13 by the own weight of the ink, it is possible to appropriately supply the ink to the inkjet head 13.

While the preferred embodiment of the invention has been described, the invention is not limited to the above-described embodiment. For example, in the above-described embodiment, a case has been described in which the membrane bundle hollow portion 3c is not provided with the center pipe, but the membrane bundle hollow portion 3c may be provided with the center pipe. Further, in the above-described embodiment, a case has been described in which the ink is a liquid to be degassed, but the liquid to be degassed may be a liquid other than the ink. Further, in the above-described embodiment, a case has been described in which the ink is supplied from the supply port 6a into the housing 4 and the ink inside the housing 4 is discharged from the discharge port 5d, but the inlet and the outlet of the ink may be reversed. That is, the ink may be supplied from the discharge port 5d into the housing 4 and the ink inside the housing 4 may be discharged from the supply port 6a.

EXAMPLES

Next, examples of the invention will be described, but the invention is not limited to the following examples.

Figure 7:
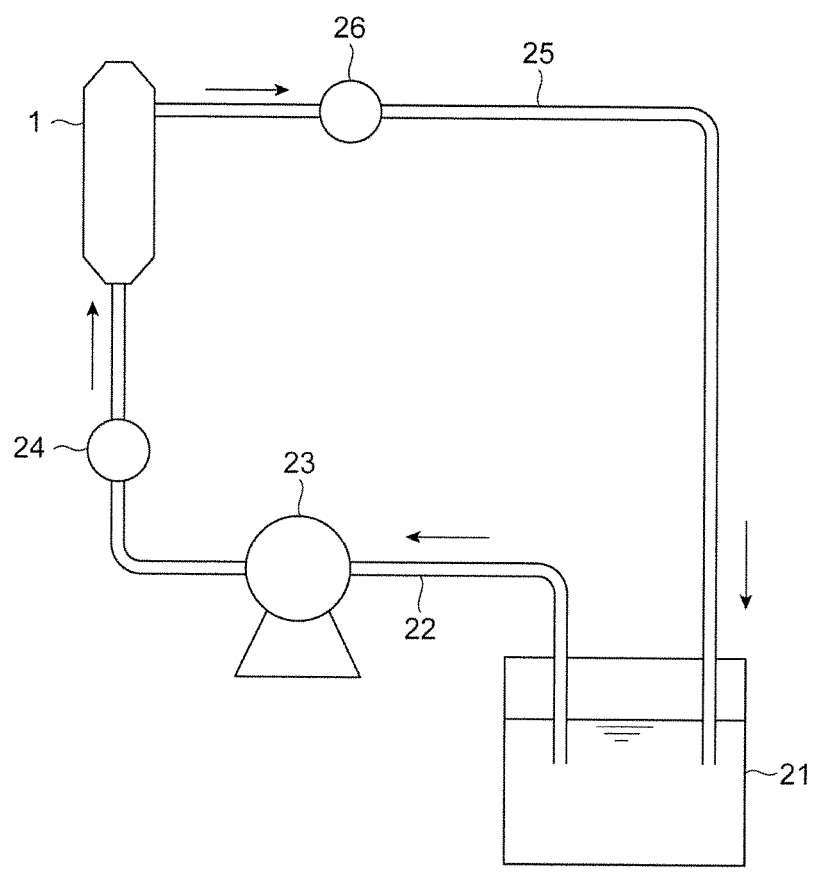
FIG. 7 is a schematic configuration diagram of a test circuit.

Hollow fiber degassing module of Examples 1 to 3 and hollow fiber degassing modules of Reference Examples 1 and 2 were prepared and an increase in pressure drop due to the circulation of ink in a test circuit shown in FIG. 7 was measured.

(Test Circuit)

As shown in FIG. 7, the test circuit has a configuration in which a first ink supply pipe 22 inserted into an ink tank 21 storing ink is connected to a supply port of the hollow fiber degassing module and a pump 23 feeding ink inside the first ink supply pipe 22 to the hollow fiber degassing module and an inlet pressure gauge 24 measuring a pressure of the ink inside the first ink supply pipe 22 are attached to the first ink supply pipe 22. Further, the test circuit has a configuration in which a second ink supply pipe 25 inserted into the ink tank 21 is connected to a discharge port of the hollow fiber degassing module and an outlet pressure gauge 26 measuring a pressure of ink inside the second ink supply pipe 25 is attached to the second ink supply pipe 25.

Example 1

The hollow fiber degassing module of Example 1 was prepared as below.

A hollow fiber membrane having an inner diameter of 100 µm and an outer diameter of 180 µm and having a side wall (membrane) of a heterogeneous structure formed of poly-4 methyl pentene-1 was prepared. Next, a large number of hollow fiber membranes lined up in the same row were woven in a reed shape by a warp so that the number of hollow fiber membranes became sixty one per inch to prepare a hollow fiber membrane sheet of a predetermined length. Next, the hollow fiber membrane sheet was wound on a cylindrical temporary core (a resin pipe) to prepare a cylindrical hollow fiber membrane bundle, the prepared hollow fiber membrane bundle was inserted into a cylindrical reed-shaped bundle diameter adjustment pipe, and the hollow fiber membrane packing ratio of the hollow fiber membrane bundle was adjusted. That is, when the hollow fiber membrane bundle is inserted into the reed-shaped bundle diameter adjustment pipe having an inner diameter larger than the outer diameter of the hollow fiber membrane bundle, the hollow fiber membrane sheet wound in a cylindrical shape is loosened so that a gap between the hollow fiber membranes is widened. For this reason, when the outer diameter of the temporary core, the length of the hollow fiber membrane sheet wound on the temporary core, and the inner diameter of the reed-shaped bundle diameter adjustment pipe are adjusted, the hollow fiber membrane packing ratio can be adjusted.

Then, in the hollow fiber membrane bundle of Example 1, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 39.0 mm so that the hollow fiber membrane packing ratio became 30.0%.

Next, the hollow fiber membrane bundle was inserted into the cylindrical body of the housing, one membrane bundle end portion of the hollow fiber membrane bundle was fixed to one opening end portion of the cylindrical body by the sealing portion, and the other membrane bundle end portion of the hollow fiber membrane bundle was fixed to the other opening end portion of the cylindrical body by the sealing portion. Further, the temporary core was extracted from the hollow fiber membrane bundle. Then, the first lid portion was attached to one opening end portion of the cylindrical body and the second lid portion was attached to the other opening end portion of the cylindrical body to thereby obtain the hollow fiber degassing module of Example 1.

Example 2

The hollow fiber degassing module of Example 2 was prepared to have the same hollow fiber membrane packing ratio as that of the hollow fiber degassing module of Example 1 except that the hollow fiber membrane packing ratio was set to 33.8%. Specifically, in the hollow fiber membrane bundle of Example 2, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 37.0 mm so that the hollow fiber membrane packing ratio became 33.8%.

Example 3

The hollow fiber degassing module of Example 3 was prepared to have the same hollow fiber membrane packing ratio as that of the hollow fiber degassing module of Example 1 except that the hollow fiber membrane packing ratio was 36.0%. Specifically, in the hollow fiber membrane bundle of Example 3, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 36.0 mm so that the hollow fiber membrane packing ratio became 36.0%.

Reference Example 1

The hollow fiber degassing module of Reference Example 1 was prepared to have the same hollow fiber membrane packing ratio as that of the hollow fiber degassing module of Example 1 except that the hollow fiber membrane packing ratio was set to 44.3%. Specifically, in the hollow fiber membrane bundle of Reference Example 1, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 33.0 mm so that the hollow fiber membrane packing ratio became 44.3%.

Reference Example 2

The hollow fiber degassing module of Reference Example 2 was prepared to have the same hollow fiber membrane packing ratio as that of the hollow fiber degassing module of Example 1 except that the hollow fiber membrane packing ratio was 51.6%. Specifically, in the hollow fiber membrane bundle of Reference Example 2, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 31.5 mm so that the hollow fiber membrane packing ratio became 51.6%.

Experiment 1

In Experiment 1, ceramic ink containing a hydrocarbon solvent ("Exxsol (registered trademark) D130" (Hydrocarbones, C14-C18, n-alkanes, iso-alkanes, cyclics, aromatics, etc) manufactured by Exxon Mobil Co., Ltd.) was used and the set temperature of the ink was 45° C.

Then, (1) the ink was circulated at an ink set flow rate of 200 g/min, a difference between the inlet pressure measured by the inlet pressure gauge 24 and the outlet pressure measured by the outlet pressure gauge 26 was calculated as a pressure drop, and the flow rate of ink was measured by a flow meter (not shown). Next, (2) the ink was circulated at an ink set flow rate of 1000 g/min, a difference between the inlet pressure measured by the inlet pressure gauge 24 and the outlet pressure measured by the outlet pressure gauge 26 was calculated as a pressure drop, and the flow rate of ink was measured by a flow meter (not shown). Additionally, the pressure drop calculated by (1) and (2) was set to an initial value.

Next, (3) the set flow rate of ink was set to 1000 g/min and was left for an arbitrary time. Next, (4) the ink was circulated at an ink set flow rate of 200 g/min, a difference between the inlet pressure measured by the inlet pressure gauge 24 and the outlet pressure measured by the outlet pressure gauge 26 was calculated as a pressure drop, and the flow rate of ink was measured by a flow meter (not shown). Next, (5) the ink was circulated at an ink set flow rate of 1000 g/min, a difference between the inlet pressure measured by the inlet pressure gauge 24 and the outlet pressure measured by the outlet pressure gauge 26 was calculated as a pressure drop, and the flow rate of ink was measured by a flow meter (not shown).

Figure 8:
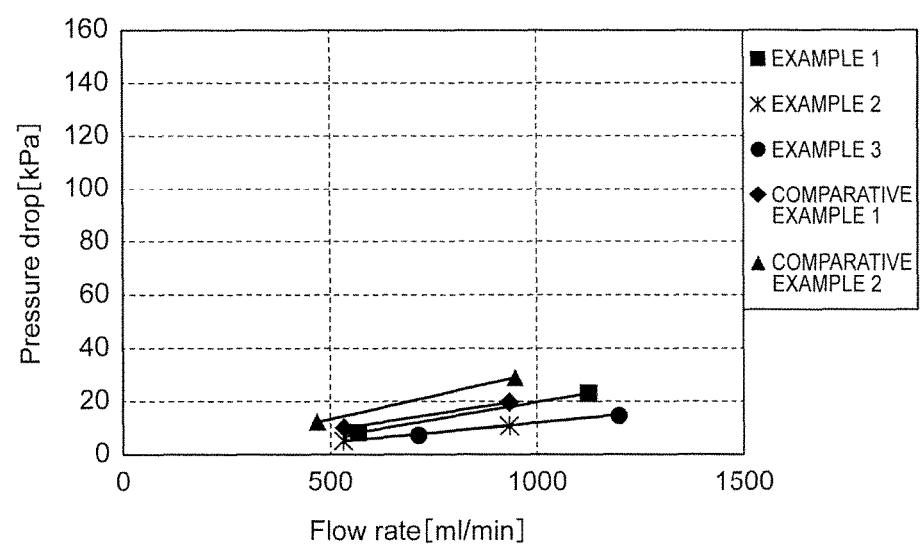
FIG. 8 is a diagram showing an experiment result immediately after the circulation of ink in Experiment 1.
Figure 9:
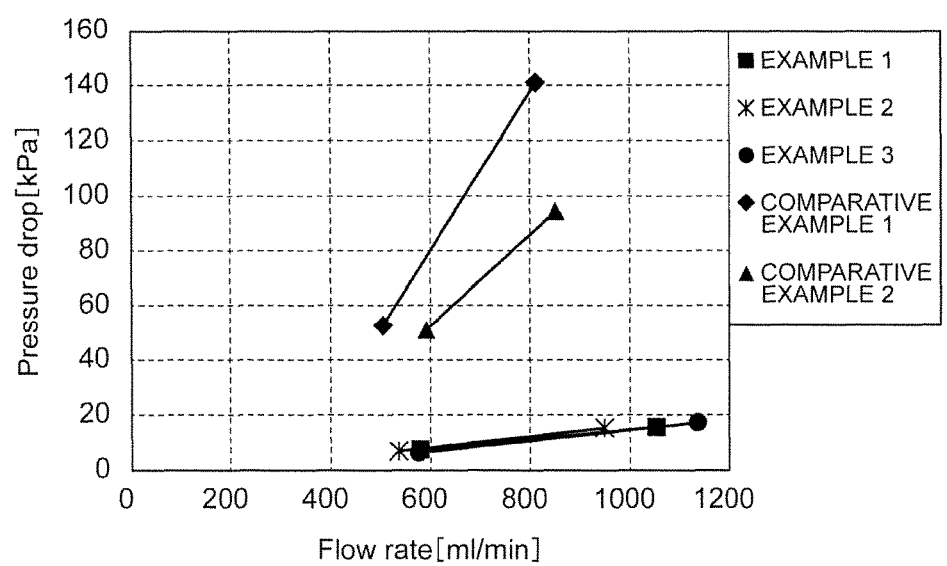
FIG. 9 is a diagram showing an experiment result after the circulation of ink for 22 hours in Experiment 1.

Then, a ratio of the pressure drop calculated by (1) and (2) with respect to the pressure drop calculated by (4) and (5) was calculated as a pressure drop increase rate. The experiment results of Examples 1 to 3 and Reference Examples 1 and 2 are shown in Table 1. Further, a graph of the experiment result immediately after the circulation of the ink is shown in FIG. 8 and a graph of the experiment result after the circulation of the ink for 22 hours is shown in FIG. 9.

ratio as that of the hollow fiber degassing module of Example 1 except that the hollow fiber membrane packing ratio was set to 30.9%. Specifically, in the hollow fiber membrane bundle of Example 4, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 38.5 mm so that the hollow fiber membrane packing ratio became 30.9%.

Example 5

The hollow fiber degassing module of Example 5 was prepared to have the same hollow fiber membrane packing ratio as that of the hollow fiber degassing module of Example 1 except that the hollow fiber membrane packing ratio was set to 35.3%. Specifically, in the hollow fiber membrane bundle of Example 5, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 36.2 mm so that the hollow fiber membrane packing ratio became 35.3%.

Example 6

The hollow fiber degassing module of Example 6 was prepared to have the same hollow fiber membrane packing

TABLE 1

| | Measurement timing | Set flow rate (g/min) | Measurement flow rate (g/min) | Inlet pressure (kPa) | Outlet pressure (kPa) | Pressure drop (kPa) |
|---|---|---|---|---|---|---|
| Example 1 | Immediately after circulation | 200 | 558.72 | 13.7 | 5.4 | 8.3 |
| | | 1000 | 1107.02 | 38.3 | 15.3 | 23 |
| | After circulation for 22 hours | 200 | 579.28 | 13.2 | 5.7 | 7.5 |
| | | 1000 | 1053.92 | 29.8 | 14.2 | 15.6 |
| Example 2 | Immediately after circulation | 200 | 523.92 | 9.6 | 4.5 | 5.1 |
| | | 1000 | 919.12 | 22 | 11.2 | 10.8 |
| | After circulation for 22 hours | 200 | 536.24 | 11.7 | 4.8 | 6.9 |
| | | 1000 | 949.96 | 27.3 | 12 | 15.3 |
| Example 3 | Immediately after circulation | 200 | 701.84 | 14.8 | 7.2 | 7.6 |
| | | 1000 | 1179.6 | 32 | 17 | 15 |
| | After circulation for 22 hours | 200 | 576.32 | 11.7 | 5.4 | 6.3 |
| | | 1000 | 1136.76 | 33.3 | 16.1 | 17.2 |
| Reference Example 1 | Immediately after circulation | 200 | 525.84 | 14.7 | 4.7 | 10 |
| | | 1000 | 919.56 | 31 | 11.4 | 19.6 |
| | After circulation for 22 hours | 200 | 505.56 | 57 | 4.4 | 52.6 |
| | | 1000 | 812.2 | 150 | 9 | 141 |
| Reference Example 2 | Immediately after circulation | 200 | 461.92 | 16 | 3.8 | 12.2 |
| | | 1000 | 933.92 | 40.6 | 11.6 | 29 |
| | After circulation for 22 hours | 200 | 592.6 | 56.6 | 5.6 | 51 |
| | | 1000 | 851.2 | 104.4 | 10 | 94.4 |

As shown in Table 1 and FIGS. 8 and 9, in Examples 1 to 3 in which the hollow fiber membrane packing ratio was 43% or less, an increase in pressure drop of the hollow fiber degassing module after the circulation of the ink for 22 hours was suppress to be low compared to Reference Examples 1 and 2 in which the hollow fiber membrane packing ratio exceeded 43%. Further, an increase in pressure drop was not substantially observed in the hollow fiber degassing module in which the hollow membrane packing ratio was about 30%. From this result, since the hollow fiber membrane packing ratio is 43% or less, it was found that a sudden increase in pressure drop could be suppressed.

Example 4

The hollow fiber degassing module of Example 4 was prepared to have the same hollow fiber membrane packing ratio as that of the hollow fiber degassing module of Example 1 except that the hollow fiber membrane packing ratio was set to 36.3%. Specifically, in the hollow fiber membrane bundle of Example 6, the outer diameter of the temporary core was set to 15.0 mm, the length of the hollow fiber membrane sheet wound on the temporary core was set to 5200 mm, and the inner diameter of the reed-shaped bundle diameter adjustment pipe was set to 35.8 mm so that the hollow fiber membrane packing ratio became 36.3%.

Experiment 2

In Experiment 2, the set temperature of the ink was set to 45° C., the set flow rate of ink was set to 1000 g/min, the ink circulation time was set to 22 hours, and the same ceramic ink as that of Experiment 1 was used. The experiment condition is shown in Table 2.

TABLE 2

| | Hollow fiber membrane packing ratio (%) |
|---|---|
| Example 1 | 30.0 |
| Example 2 | 33.8 |
| Example 3 | 36.0 |
| Example 4 | 30.9 |
| Example 5 | 35.3 |
| Example 6 | 36.3 |
| Reference Example 1 | 44.3 |
| Reference Example 2 | 51.6 |

Then, in the hollow fiber degassing modules of Examples 1 to 6 and Reference Examples 1 and 2, a difference between the inlet pressure measured by the inlet pressure gauge 24 and the outlet pressure measured by the outlet pressure gauge 26 immediately after the circulation of the ink was calculated as pressure drop. Further, a difference between the inlet pressure measured by the inlet pressure gauge 24 and the outlet pressure measured by the outlet pressure gauge 26 after the circulation of the ink for 22 hours was calculated as pressure drop. Then, a ratio of the pressure drop immediately after the circulation of the ink for 22 hours with respect to the pressure drop immediately after the circulation of the ink was calculated as a pressure drop increase rate. The experiment result is shown in FIG. 10.

Figure 10:
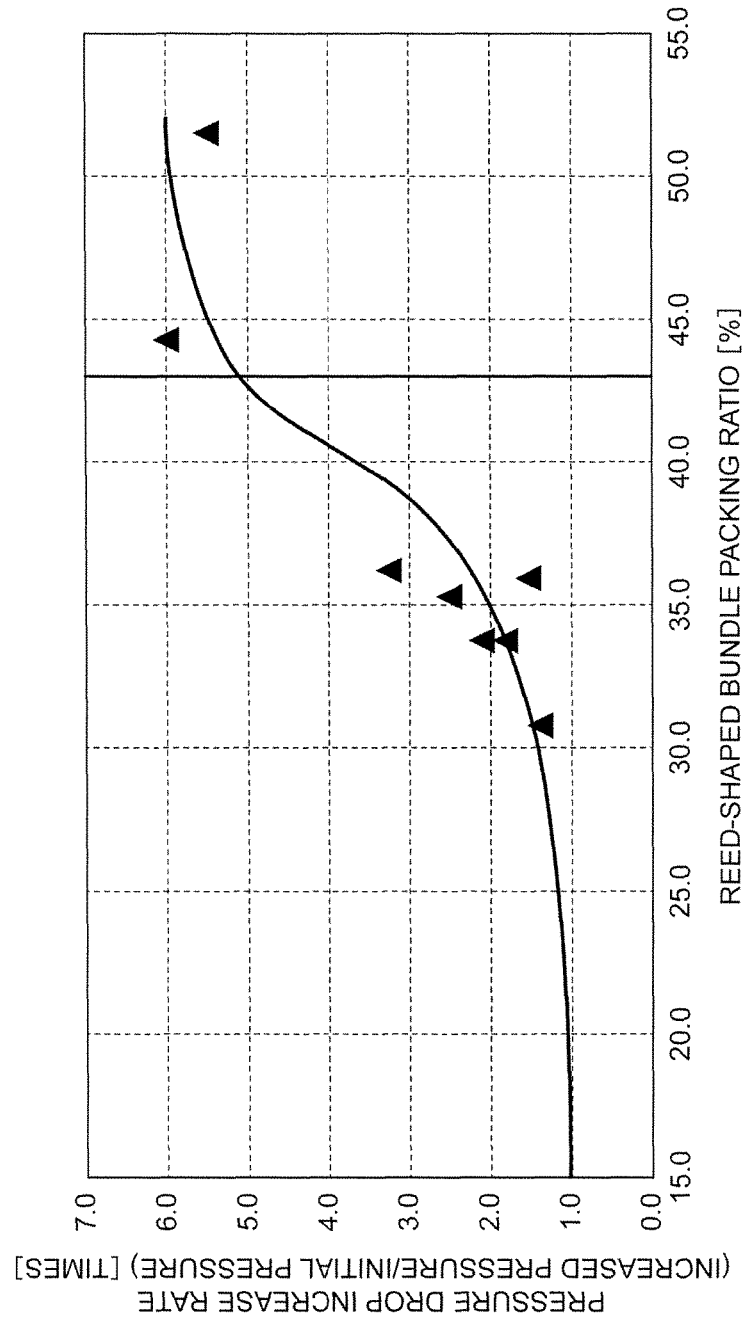
FIG. 10 is a diagram showing an experiment result in Experiment 2.

As shown in Table 2 and FIG. 10, it is found that the pressure drop increase rate increases due to an increase in hollow membrane packing ratio. In particular, the pressure drop increase rate suddenly increases when the hollow fiber membrane packing ratio exceeds 38% and the pressure drop increases five times when the hollow fiber membrane packing ratio exceeds 43%. From this result, an increase in pressure drop can be adjusted in accordance with the adjustment of the hollow fiber membrane packing ratio. That is, a sufficient gap is forming between the hollow fiber membranes when the hollow fiber membrane packing ratio is set to be low. Accordingly, it is considered that the ink passage is not easily blocked when the hollow fiber membrane is swollen and the hollow fiber membrane bundle is bent by the flow of the ink. Meanwhile, a gap between the hollow fiber membranes decreases when the hollow membrane packing ratio is set to be high. Accordingly, it is considered that the ink passage is easily blocked due to the flow of the ink or the minute swelling of the hollow fiber membrane.

REFERENCE SIGNS LIST

1: hollow fiber degassing module, 2: hollow fiber membrane, 2a: membrane, 2b: hollow portion, 3: hollow fiber membrane bundle, 3a: one membrane bundle end portion, 3b: other membrane bundle end portion, 3c: membrane bundle hollow portion, 4: housing, 5: cylindrical body, 5a: one opening end portion, 5b: other opening end portion, 5c: side wall, 5d: discharge port, 5e: connection portion, 5f: female screw, 6: first lid portion, 6a: supply port, 6b: connection portion, 6c: female screw, 7: second lid portion, 7a: intake port, 7b: connection portion, 7c: female screw, 8: sealing portion, 8a: communication port, 9: sealing portion, 11: inkjet printer, 12: ink storage portion, 13: inkjet head, 14: first ink supply pipe, 15: second ink supply pipe, 16: suction pump, 17: intake pipe, 21: ink tank, 22: first ink supply pipe, 23: pump, 24: inlet pressure gauge, 25: second ink supply pipe, 26: outlet pressure gauge, A1: apparent cross-sectional area of hollow fiber membrane bundle, A2: apparent cross-sectional area of hollow fiber membrane, A3: sum of apparent cross-sectional area of hollow fiber membrane, G: gap, L: axial direction, R: hollow fiber membrane packing ratio.

The invention claimed is:

1. A hollow fiber degassing module which includes a hollow fiber membrane bundle obtained by bundling a plurality of hollow fiber membranes in a cylindrical shape and a cylindrical body receiving the hollow fiber membrane bundle, the cylindrical body extending in an axial direction, the hollow fiber degassing module configured to degas a liquid by supplying the liquid to the outside of the hollow fiber membrane and by depressurizing the inside of the hollow fiber membrane,
wherein a hollow fiber membrane packing ratio which is a ratio of a sum of an apparent cross-sectional area of the hollow fiber membrane with respect to an apparent cross-sectional area of the hollow fiber membrane bundle is in a range of 43% or less,
wherein a gap is formed between the cylindrical body and the hollow fiber membrane bundle, and
wherein the hollow fiber membrane bundle is eccentric with respect to the center axis of the cylindrical body.

2. The hollow fiber degassing module according to claim 1, wherein the hollow fiber membrane packing ratio is in a range of 20% or more, and 43% or less.

3. The hollow fiber degassing module according to claim 1, wherein the hollow fiber membrane contains a material which is swollen by the liquid.

4. The hollow fiber degassing module according to claim 1, wherein the hollow fiber membrane contains polyolefin resin.

5. The hollow fiber degassing module according to claim 1, wherein the liquid is at least one kind selected from the group consisting of glycols, glycol monoalkyl ethers, glycol dialkyl ethers, glycol monoacetates, glycol diacetates, alcohols, ketones, acetic acid esters, lactic acid esters, saturated hydrocarbons, unsaturated hydrocarbons, cyclic saturated hydrocarbons, cyclic unsaturated hydrocarbons, aromatic hydrocarbons, terpenes, cyclic imides, 3-alkyl-2-oxazolidinone, N-alkyl pyrrolidone, lactones, and nitrogen-containing solvents.

6. The hollow fiber degassing module according to claim 1, wherein the liquid is UV ink or ceramic ink.

7. An inkjet printer in which ink stored in an ink storage portion is supplied to an inkjet head through an ink passage, the inkjet printer comprising:
a hollow fiber degassing module is attached to the ink passage,
wherein the hollow fiber degassing module includes a hollow fiber membrane bundle obtained by bundling a plurality of hollow fiber membranes in a cylindrical shape and a cylindrical body receiving the hollow fiber membrane bundle, the cylindrical body extending in an axial direction, the hollow fiber degassing module configured to degas a liquid by supplying the liquid to the outside of the hollow fiber membrane and by depressurizing the inside of the hollow fiber membrane,
wherein a hollow fiber membrane packing ratio which is a ratio of a sum of an apparent cross-sectional area of the hollow fiber membrane with respect to an apparent cross-sectional area of the hollow fiber membrane bundle is in a range of 43% or less,
wherein a gap is formed between the cylindrical body and the hollow fiber membrane bundle, and
wherein the hollow fiber membrane bundle is eccentric with respect to the center axis of the cylindrical body.

8. A liquid degassing method of degassing a liquid, the liquid degassing method comprising steps of:

supplying the liquid to a gap between hollow fiber membranes from a hollow portion of a hollow fiber membrane bundle; and depressurizing the inside of the hollow fiber membrane using a hollow fiber degassing module, wherein the hollow fiber degassing module includes a hollow fiber membrane bundle obtained by bundling a plurality of hollow fiber membranes in a cylindrical shape and a cylindrical body receiving the hollow fiber membrane bundle, the cylindrical body extending in an axial direction, the hollow fiber degassing module configured to degas a liquid by supplying the liquid to the outside of the hollow fiber membrane and by depressurizing the inside of the hollow fiber membrane, wherein a hollow fiber membrane packing ratio which is a ratio of a sum of an apparent cross-sectional area of the hollow fiber membrane with respect to an apparent cross-sectional area of the hollow fiber membrane bundle is in a range of 43% or less, wherein a gap is formed between the cylindrical body and the hollow fiber membrane bundle, and wherein the hollow fiber membrane bundle is eccentric with respect to the center axis of the cylindrical body.

9. The hollow fiber degassing module according to claim 1, wherein the gap is formed all around the hollow fiber membrane bundle.

10. The hollow fiber degassing module according to claim 1, wherein the hollow fiber membrane packing ratio is a ratio of a sum of the apparent cross-sectional area of the hollow fiber membrane with respect to the apparent cross-sectional area of the hollow fiber membrane bundle when the swelling of the hollow fiber membrane becomes saturated.

* * * * *